United States Patent [19]

Meyer

[11] Patent Number: 4,910,949
[45] Date of Patent: Mar. 27, 1990

[54] CROP MATERIAL GUIDE MEANS IN A MACHINE FOR FORMING CYLINDRICAL BALES

[75] Inventor: Joey L. Meyer, Spirit Lake, Iowa
[73] Assignee: Vermeer Manufacturing Co., Pella, Iowa
[21] Appl. No.: 297,030
[22] Filed: Jan. 17, 1989
[51] Int. Cl.⁴ ........................................... A01D 57/26
[52] U.S. Cl. ......................................... 56/341; 100/88
[58] Field of Search ................. 56/341, 343, DIG. 21; 100/88

[56] References Cited

U.S. PATENT DOCUMENTS

| | | | |
|---|---|---|---|
| 4,103,475 | 8/1978 | Kampman et al. | 56/341 |
| 4,172,354 | 10/1979 | Vermeer et al. | 56/341 |
| 4,217,746 | 8/1980 | Cicci et al. | 56/DIG. 1 |
| 4,244,167 | 1/1981 | Seefeld et al. | 56/341 |
| 4,648,239 | 3/1987 | Geiser et al. | 56/341 |

FOREIGN PATENT DOCUMENTS

| | | | |
|---|---|---|---|
| 0095621 | 12/1983 | European Pat. Off. | 56/341 |
| 2101929 | 1/1983 | United Kingdom | 100/88 |
| 2203687 | 10/1988 | United Kingdom | 56/341 |

Primary Examiner—Stephen J. Novosad
Assistant Examiner—Terry Lee Melius
Attorney, Agent, or Firm—Rudolph L. Lowell

[57] ABSTRACT

A bale guide means is located at each end of a roller for feeding crop material into an expandable bale forming chamber to engage and guide the material at such ends inwardly of the bale to form a bale with end surfaces of planar contour and bale end portions with a density comparable to the density of the inner bale portions.

4 Claims, 3 Drawing Sheets

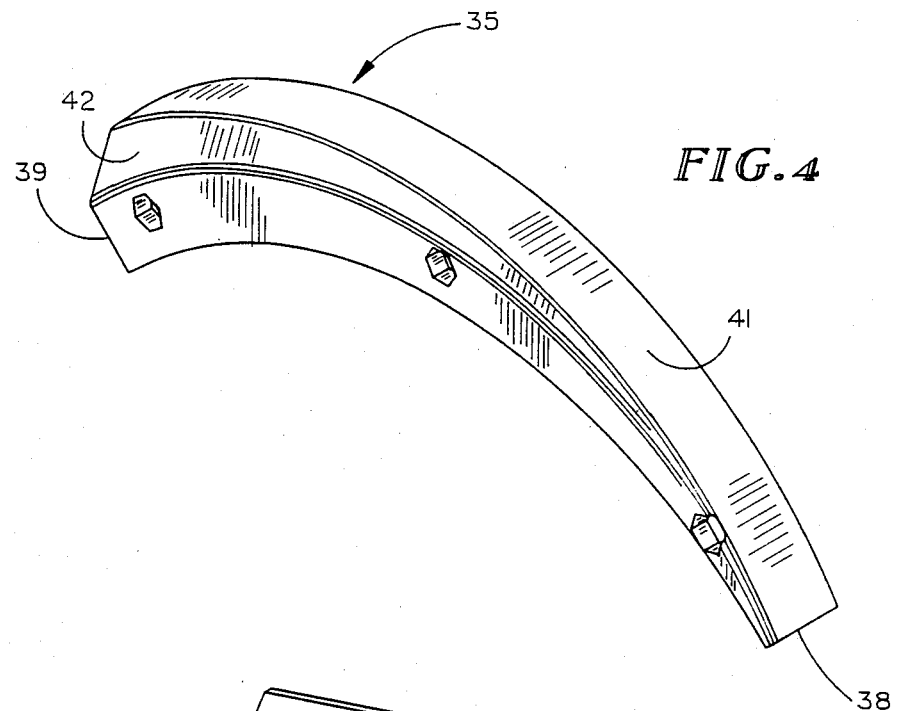
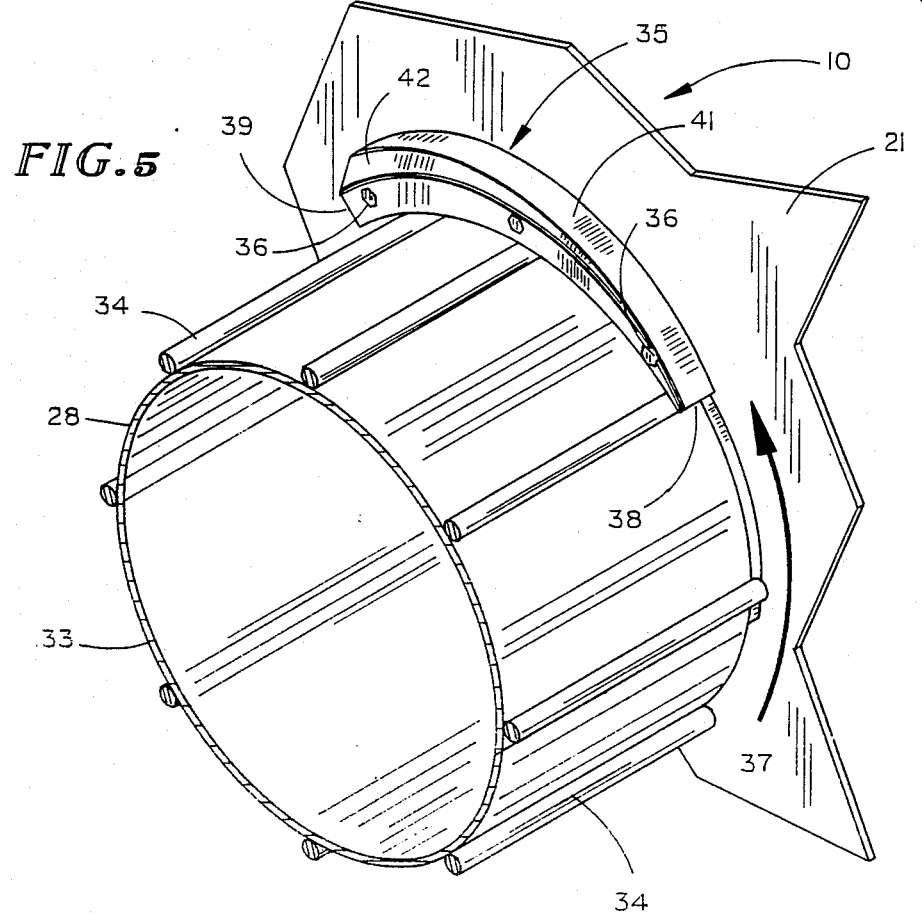

CROP MATERIAL GUIDE MEANS IN A MACHINE FOR FORMING CYLINDRICAL BALES

This invention relates to a machine for forming cylindrical bales of a crop material such as hay or the like in which the bale forming chamber is defined by expandable belt runs and, in particular, to a wedge means at each end of the forming chamber for directing the crop material inwardly of the bale being formed.

BACKGROUND OF THE INVENTION

In bale forming machines having a bale forming chamber defined by expandable belt runs and wherein a crop material entrance is adjacent a bottom portion thereof, the bale being formed is generally supported in part on a feed conveyor or roller which feeds the material into the chamber. As the crop material enters the chamber, it is engaged by the belt runs and then concurrently rolled and compressed into the bale being formed. In this forming operation, some of the material acted upon by the end belts is pressed outwardly from the bale and against the chamber end walls whereby to increase the friction between the bale ends and end walls of the forming chamber along with increasing the belt tension. This action frequently results in the bale being of a reduced density over the end portions thereof. Additionally, the surfaces of the bale end portions tend to have a shaggy or "pulled-out" appearance of the crop material rather than an even or smooth surface appearance.

SUMMARY OF THE INVENTION

The present invention provides a hay guide or wedge at each end of a belt expandable bale forming chamber which coacts with a feed roller to direct the incoming crop material at each end of the roller inwardly of a bale being formed. Since the bale is continuously enlarged by the incoming crop material, the material at the ends of such bale is continuously directed inwardly of the bale. The end surfaces of the bale are thus formed with a substantially flat or smooth contour and the density of the bale over the end portions thereof is comparable to the inner bale density so as to improve the weather resisting characteristics of the bale. Because of the flat contour of the bale end surfaces, the friction of the bale with the chamber end walls is reduced to, in turn, reduce the tension in the chamber forming belts.

BRIEF DESCRIPTION OF THE DRAWINGS

FIG. 4 is an enlarged perspective view of a wedge member that forms part of the material guide means of this invention;

FIG. 5 is an enlarged detail perspective view of the material guide means;

DESCRIPTION OF THE PREFERRED EMBODIMENT

Figure 1:
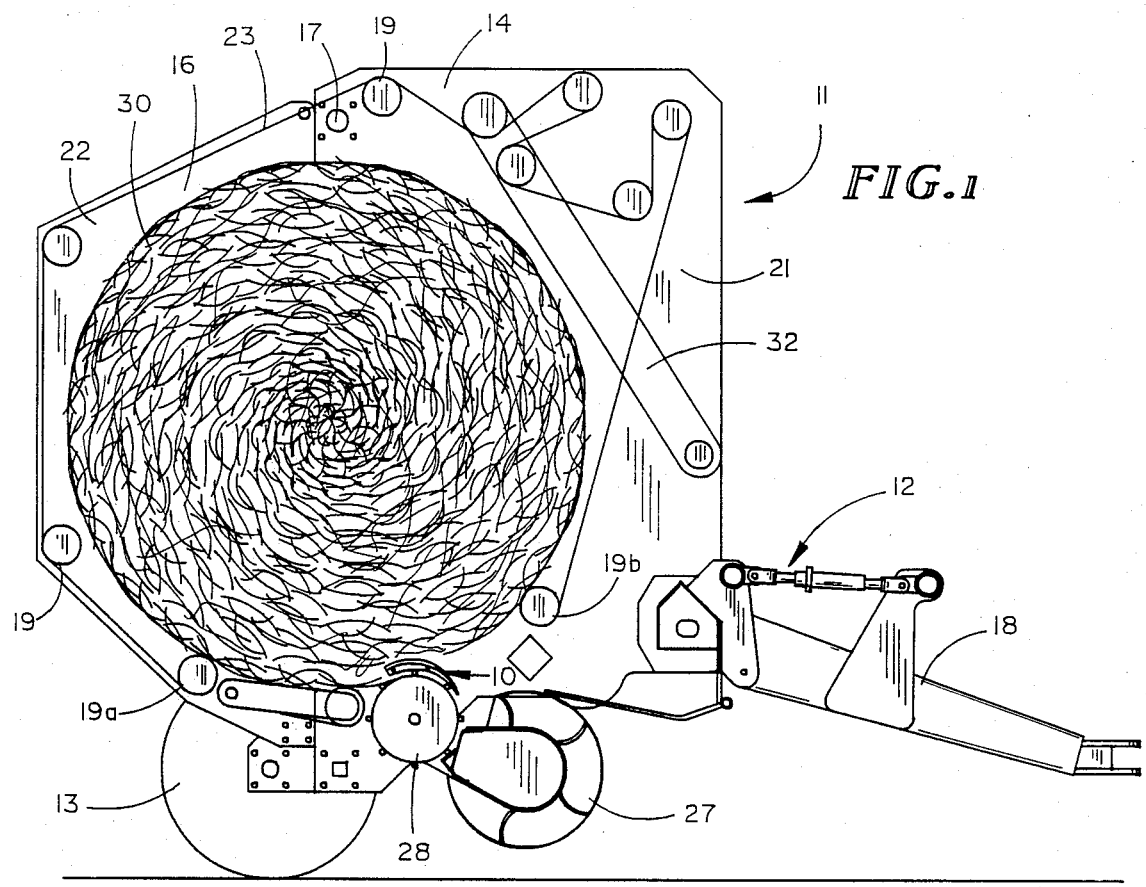
FIG. 1 is a diagramatic view in longitudinal section of a baling machine embodying the material guide means of this invention.
Figure 2:
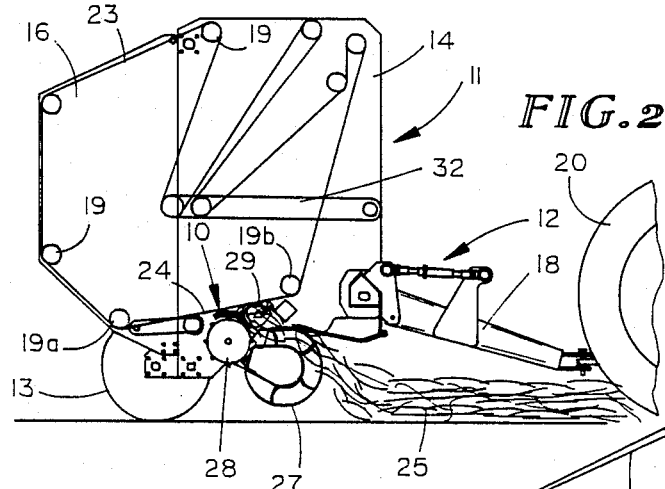
FIG. 2 is a reduced showing of the machine of FIG. 1 illustrating the initial forming of a bale core in a bale starting chamber.

With reference to the drawings, the bale material guide means 10 of this invention is shown in FIG. 1 embodied in a machine 11 for forming large cylindrical shaped bales. The machine 11 includes a portable frame 12 mounted on ground wheels 13 and equipped with a front housing section 14 and a rear housing section 16 pivoted at 17 on the front housing section for pivotal movement from the bale forming position shown in FIG. 1 to a bale discharge position (not shown) projected upwardly and rearwardly from the pivot 17. A draft tongue 18 extends forwardly of the frame 12 for attachment to a tractor, indicated at 20 (FIGS. 2 and 3), which draws the machine.

A plurality of lateral rolls 19 extend the full width of the machine 11 and are supported on the end walls 21 and 22 of the housing sections 14 and 16, respectively, with only one of such end walls for each housing section being shown in FIG. 1. Each of a plurality of endless belts 23 extended about the rolls 19 has a lower belt run 24 (FIGS. 2 and 3) between the lower belt rolls, indicated at 19(a) and 19(b), which belt runs 24 are expandable upwardly (FIG. 3) to define an expandable bale forming chamber 26.

Figure 3:
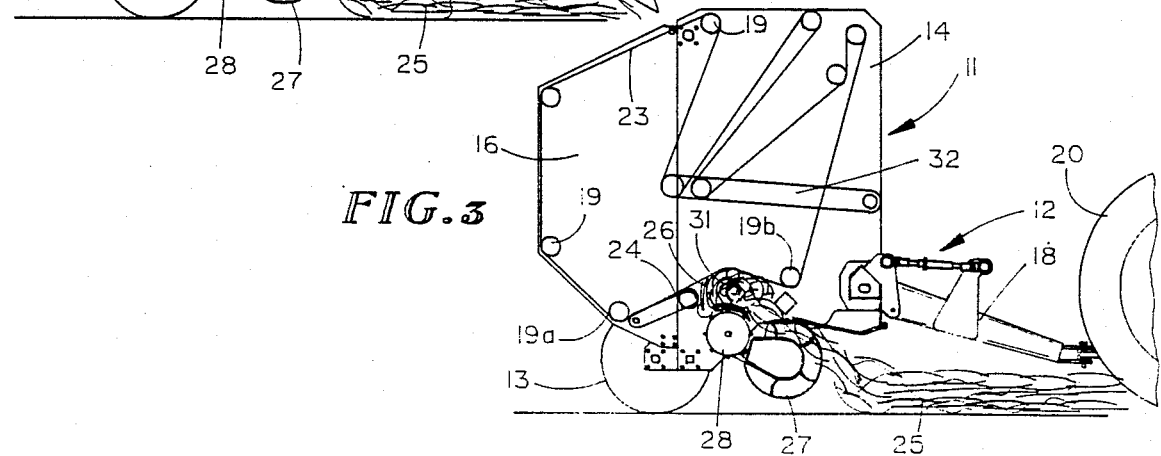
FIG. 3 is illustrated similarly to FIG. 2 and shows the formed bale core entering the bale forming chamber.

As the machine 11 is drawn forwardly over a windrow of crop material 25 (FIG. 2), such material is picked up by a pick-up unit 27 and lifted upwardly and rearwardly onto a material feed roller 28 which feeds the material into engagement with the lower belt runs 24 and into a bale starting chamber 29 that is defined by the feed roller 28 and the lower belt runs 24. When the bale core 31 reaches a size to overcome the tension in the belts 23, it expands the belt runs 24 an is admitted entrance into the bale forming chamber 26 as illustrated in FIG. 3. At this time, material from the feed roller 28 is continuously fed into the forming chamber 26 and about the bale 30. Tension in the belts 23 is maintained by a tensioning mechanism indicated generally at 32. For a more detailed description of the baling machine 11, reference is made to U.S. Pat. No. 4,172,354.

The guide means 10 of this invention for directing crop material fed into the bale forming chamber inwardly of the ends of the bale being formed includes a wedge member 35 (FIGS. 4 and 5) located at each end of the forming chamber 26 in operative association with an adjacent end of the feed roller 28. The feed roller 28 extends over the full length of the forming chamber 26 and includes a tubular cylindrical body member 33 having a series of longitudinal material engaging rod members 34 secured to the outer peripheral portion thereof in a circumferencially spaced relation. A wedge member 35 is of an arcuate shape longitudinally thereof and of a generally rectangular shape in transverse cross section and is mounted on an adjacent end wall 21 of the bale forming chamber 26 in a concentrically spaced relation with an upper peripheral portion of the feed roll 28 at a position adjacent to the rod members 34

(FIGS. 1 and 5). A wedge member is held in a fixed position on an end wall 21 by countersunk bolts 36 that are rigidly secured to an adjacent end wall 21.

A wedge member 35 (FIG. 4) has a width of constant dimension and a thickness of progressively increasing dimension over the full length thereof in the direction of rotation of the feed roller 28 indicated by the arrow 37 in FIG. 5. Each wedge member has a lead end 38 and a trailing end 39 relative to the direction of rotation of the feed roller 28 with the lead end being of a thickness to initially engage and direct the crop material at the adjacent end of the feed roll inwardly of the bale being formed. The upper surface 41 of a wedge member 35 has the side portion 42 thereof remote from an adjacent end wall 21 of the forming chamber of a beveled contour of progressively increasing size in the direction of rotation of the feed roller.

Figure 7:
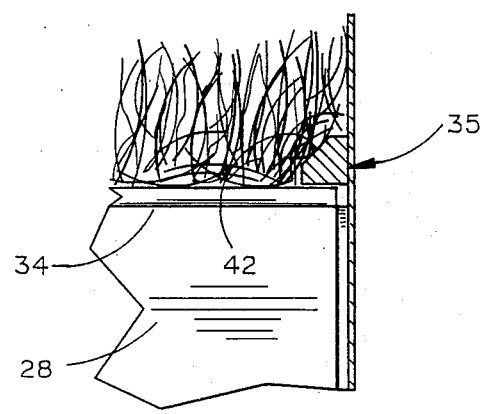
FIG. 7 is illustrated similarly to FIG. 6 and shows the machine of FIG. 1 utilizing the bale guide means of this invention.
Figure 7A:
FIG. 7A shows a corner portion of a bale formed in accordance with the showing in FIG. 7.
Figure 6B:
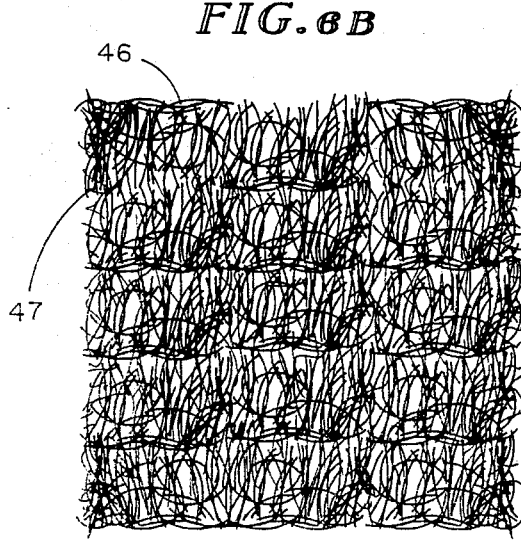
FIG. 6B illustrates the appearance of a bale formed in accordance with the showing in FIG. 6.

In the operation of the baling machine, the crop material initially picked up by the pick up 27 is moved into the bale starting chamber 29 without any action thereon by the bale guide means 10. However, on admission of the bale core 31 into the forming chamber 26 (FIGS. 1 and 3) and the conveying of the material by the feed roller 28 directly into the bale forming chamber, the material at each end of the feed roll is engaged by a bale guide means 10. This material is initially engaged by the lead end of the wedge members 35 and on movement of the material along the length of the wedge member it is progressively directed inwardly of the forming bale by the bevel side portion 42 with this action being best illustrated in FIG. 7. Since the crop material is continuously fed by the feed roller 28, in what might be termed a ribbon form, into the forming chamber, each wrap of material about the forming bale is separately acted upon by the guide means 10 (FIGS. 7 and 7A) so that all portions of the end surface of a completed bale are directed inwardly of the bale.

Figure 7B:
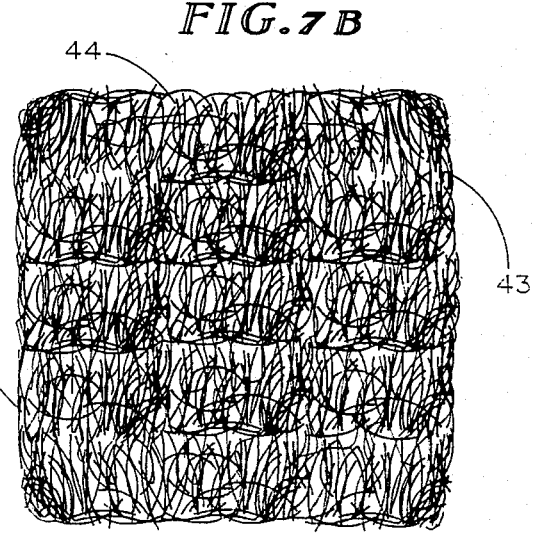
FIG. 7B illustrates the appearance of a bale formed with the material guide means of this invention.

With reference to FIG. 7B, it is seen, therefore, that each bale end surface 43 is of a smooth or even contour so as to be free of any protruding tufts of material. In this manner, a completed bale 44 not only presents an overall clean-cut appearance, but the deflecting of the material over the bale end portions acts to maintain the bale density in such portions comparable to the density within the bale.

Figure 6:
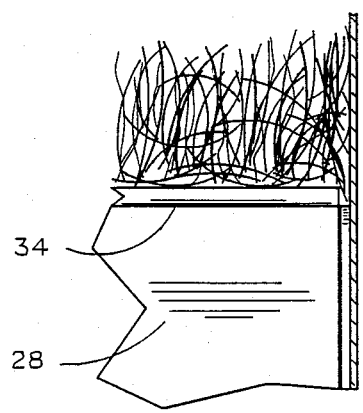
FIG. 6 is a diagramatic view illustrating the forming of a bale in the machine of FIG. 1 without utilizing the wedge member shown in FIG. 4.
Figure 6A:
FIG. 6A shows a corner portion of a bale formed in accordance with the showing in FIG. 6.

FIG. 6 illustrates the operation of the machine 11 without utilizing the wedge member 35 of FIG. 4 in association with the feed roller 28. The crop material thus tends to be pressed by the end ones of the belts 23 outwardly from the bale over the end portions thereof and into engagement with the end walls 21 and 22 of the baling chamber 26 so as to increase the friction between the forming bale and such end walls. As shown in FIGS. 6A ad 6B, the resultant bale 46 has the end surfaces 47 thereof of a shaggy, uneven appearance and of a lesser density than the inner portions of the bale.

It is to be understood that the wedge members 35 at opposite ends of the bale forming chamber 26 are of a left hand and right hand construction. In all other respects, they are identical in operation and in their assembly with respect to the feed roller 28 and end walls 21.

Although the invention has been described with respect to a preferred embodiment thereof, it is to be understood that it is not to be so limited since changes and modifications can be made therein within the full intended scope of the invention as defined in the appended claim.

I claim:

1. In a machine for forming large round bales of a crop material having a main frame with a pair of transversely spaced side walls and a plurality of transversely spaced endless belts providing an expandable bale forming chamber extended between and of a length defined by said side walls and a roller for feeding crop material into said chamber over the length thereof extended between said side walls in supporting engagement with a lower portion of the bale being formed, the improvement comprising:
    (a) means at each end of the chamber for guiding the crop material at each end of the feed roller inwardly of the bale being formed in the chamber, including an arcuate wedge member mounted on each side wall having an arcuate bottom surface in a concentrically spaced relation with a top peripheral portion of the feed roller, and an upper surface including a beveled portion facing the bale being formed in the chamber.

2. The bale forming machine according to claim 1 wherein:
    (a) said upper surface includes a planar portion in a side by side relation with said beveled portion and said beveled portion is of progressively increased size in the direction of rotation of the feed roller.

3. The baling machine according to claim 2 wherein:
    (a) each wedge member has a width of constant dimension and a thickness of progressively increasing dimension in the direction of rotation of the feed roller.

4. The baling machine according to claim 3 wherein:
    (a) each wedge member has a lead end and a trailing end relative to the direction of rotation of the feed roller, with the lead end being of a thickness to initially engage crop material at an end of the feed roller for progressive movement of the material inwardly of the bale being formed.

* * * * *